Figure 1:
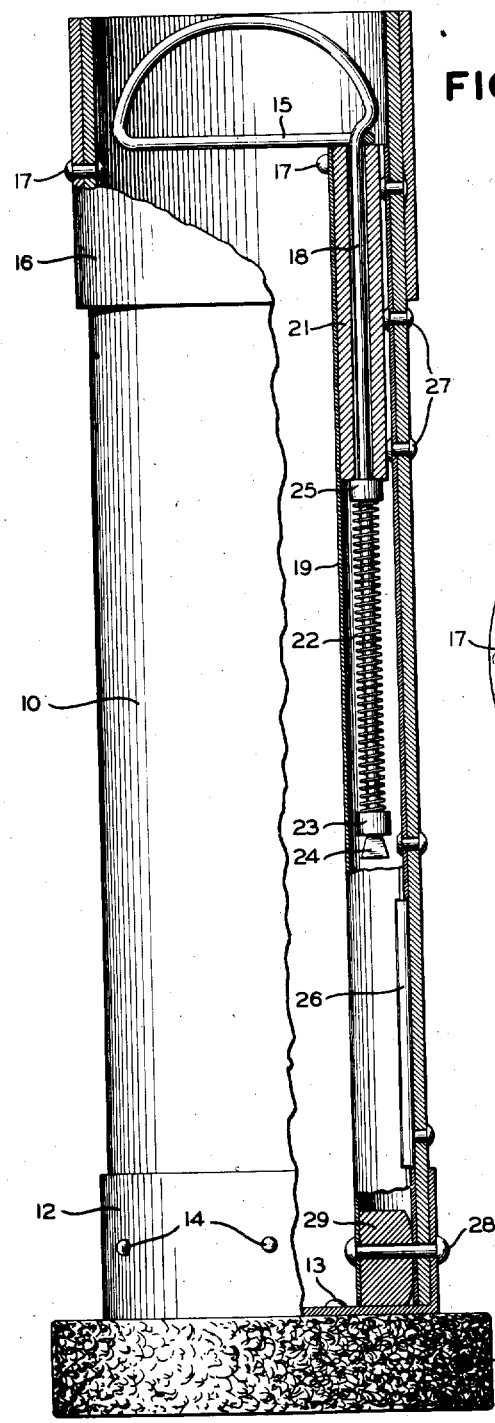

Nov. 5, 1935.  E. IRVING  2,019,858

REMOVABLE CLOSURE ASSEMBLY FOR PNEUMATIC CARRIERS

Filed July 1, 1933

INVENTOR
E. IRVING
BY Eugene E. Brown
ATTORNEY

Patented Nov. 5, 1935

2,019,858

UNITED STATES PATENT OFFICE 2,019,858

REMOVABLE CLOSURE ASSEMBLY FOR PNEUMATIC CARRIERS

Ellery Irving, East Orange, N. J., assignor to The Western Union Telegraph Company, New York, N. Y., a corporation of New York Application July 1, 1933, Serial No. 678,702

8 Claims. (Cl. 243—35)

This invention relates to pneumatic dispatch carriers, more particularly, to means providing for the ready removal of parts of the carrier and means for increasing the strength of the removable parts or their ability to withstand shock.

This invention has for its primary object the improvement of pneumatic dispatch carriers or receptacles such as described in Patent No. 1,176,918 granted to John T. Needham, March 28, 1916. It is to be understood of course that the improvements provided according to this invention may be applied to any other suitable type of dispatch carrier. Due to the strenuous service to which carriers of this type are put, particularly, in systems that require long distance transmission such as telegraph or message dispatch service, it is highly desirable that each separate element of the carrier be readily detachable from the remaining portion of the carrier so that it may be renewed without damage to the carrier or removed element. Heretofore substantially all elements of the carrier such as the buffer head, the buffer head retaining cap, and the follow end collar, have been renewable due to the fact that they are joined to the carrier body by means of rivets which may be readily removed. However, the carriers of the type above referred to have another very vital and essential element, namely, the closure or message retainer element, which as constructed heretofore was not readily removable due to the fact that it was held in place by ears or tabs formed on the assembly tube or housing which were passed through the carrier body and bent over to hold the assembly in place. When an attempt was made to remove this element of the carrier these tabs would have to be straightened out, during the process of which, usually, either the carrier body itself was considerably damaged or the tabs were broken off the assembly tube. In most instances damage resulted to both members.

According to this invention the closure assembly is held to the carrier body by means of rivets instead of tabs and an arrangement provided so that the closure assembly carrying the tube or member may be withdrawn from the carrier shell by the removal of only one rivet or holding member.

It is another object of this invention, therefore, to provide for the ready removal of the closure member assembly of a pneumatic dispatch carrier without damage to the carrier shell or the assembly retaining member. Another object is to make all parts of the carrier readily renewable. A further object is to secure all the carrier elements to the carrier body or shell in such a manner that the shell is not damaged in use by the action of the holding elements nor damaged when it is desired to remove the elements for renewal.

A still further object of this invention is to strengthen the elements comprising the closure member assembly so as to decrease the number of renewals necessary.

Figure 2:
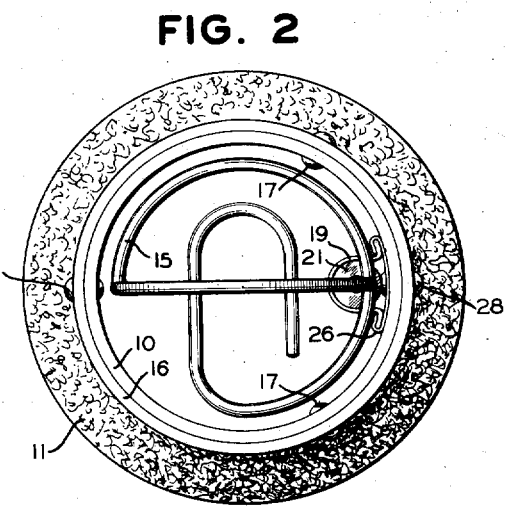

These and other objects will be apparent from the following description and claims taken in conjunction with the accompanying drawing in which:

Fig. 1 shows a view partly in section of a pneumatic carrier embodying this invention, and Fig. 2 shows an end view looking down from the upper end of the carrier.

A carrier of the type to which this invention relates comprises a tubular shell 10, provided with a buffer or wearing head 11, secured to the bottom of cap member 12 by means of rivets 13. The cap in turn encloses one end of the shell 10 and is riveted thereto by means of rivets 14. The other end of the shell is open but for the grille work of the closure or message retaining member 15. For strengthening the carrier body at the open end, a collar 16 is fitted around the body and secured thereto by rivets 17. Any of these elements may be readily removed from the carrier shell simply by removing the rivets by any suitable process such as grinding the heads of the rivets off and knocking them out, and a new element attached in its place.

The closure member for the carrier provided according to this invention is similar to that provided in the Needham patent referred to above. A rod 15 is arranged to form a grid by being bent substantially in the form of a spiral disposed transversely across the end of the carrier. From the outer end of this spiral a portion of the rod is formed into an arch to provide a handle or bail by being bent upward and across the end of the carrier and downward. Where it crosses the grid it passes just inside the outer convolution of the spiral and extends down axially of the carrier to form a stem. The handle provides means by which the closure member may be pulled outwardly to open the carrier for removing material enclosed.

The stem portion 18 of the closure member is enclosed within a substantially U-shaped tube or housing 19 which extends substantially the entire length of the shell. Brazed or otherwise suitably secured in the upper end of this housing tube is a sleeve 21 through which the stem 18 passes.

The stem extends downwardly beyond the sleeve into the tube 19 and passes through a compression spring 22 which normally retracts the stem into the tube. The lower end of the spring presses against a collar 23 secured to the end of the stem by upsetting or flattening a portion 24 of the end. The upper end of the compression spring presses against the lower end of the sleeve 21 through a collar 25.

At the upper end of the sleeve 21 the outer convolution of the grid work 15 of the closure member passes behind the stem and rests upon the upper end of the housing tube 19 and upper end of the sleeve which is flush with the housing tube. Where the stem 18 passes the rod of the grid work it is bent backward sharply to form a shoulder to enable the upper or bail portion of the closure member to rest upon the grid. With this arrangement the spring 22 pulls downwardly on the stem 18 to hold the closure member in message retaining position while the shoulder provided in the stem and the grid upon which it rests furnish a stop or abutment member upon which the closure member rests.

The carrier is opened for removing material, such as messages, retained therein by engaging the handle or bail of the grid and withdrawing the same against the compression of spring 22 until the transverse portion of the grid can be swung laterally over the end of the carrier by rotating the grid about the stem 18. It is then released and permitted to rest on the rim of the carrier. After the material is removed or inserted, as the case may be, the carrier is again closed by pushing the grid around until it snaps in its original closed position in the end of the carrier due to the action of spring 22.

As already pointed out briefly, the closure member assembly and housing tube were heretofore retained in the carrier by providing ears or tabs along the edge of the substantially U-shaped tube which extended through the wall 10 of the carrier body and were clinched on the outer surface. In order to make the assembly more readily removable and to obviate difficulties arising from the use of tabs or ears a channel member 26 has been provided to extend the full length of the closure member assembly tube and is secured to the internal surface of the carrier shell by any suitable means such as rivets 27. The outer edges of this member are turned over to provide the runway of the channel. The closure assembly tube 19 is retained in this channel by forming lips at the edge of the straight sides of the U-shaped tube, these lips being arranged to feed into the runways of the channel. Ordinarily sufficient clearance is provided in the runways so that a lip extending the full length of the edges of the tube 19 may slide easily through the runways. It may be desirable in certain instances to use several short lips or ears instead of a continuous lip along the edge of the housing tube for cutting down the resistance to sliding or for some other reason. With this arrangement the tube is of sufficient length to extend down to the bottom of the carrier body and rest against the head formed by cup member 12. The channel 26 is assembled as a somewhat permanent part of the carrier shell although it too can be replaced if necessary. When it is desired to install the closure assembly the lips of the assembly tube are engaged in the runways of the channel and the whole assembly pushed downwardly into the carrier until the lower end of the tube rests against the bottom of cup member 12 as illustrated in the drawing. This provides an effective support and together with the fact that the marginal flanges are held in the runway of a securely mounted channel substantially insures against buckling. The assembly is retained in position by passing preferably a single rivet 28 through the lower end of the tube and through the shell and flange of the head forming cup 12. A filler block 29 may be provided for strengthening the lower end of the tube where the rivet 28 passes through. When it is desired to remove the assembly for repair or replacement it is only necessary to remove the single rivet 28 before the assembly can be withdrawn.

The particular advantages of the improvements as set forth in this invention may be enumerated substantially as follows. In the type of carrier heretofore employed in which ears or tabs are utilized for holding the closure assembly in place, the difficulty in removing the assembly without damaging either the assembly tube or the carrier shell or both proved to be so great that it was the general practice to discard the whole carrier if trouble developed in any part of the closure assembly mechanism. According to this invention the assembly has been made readily removable and this may be accomplished by the simple process of removing a small rivet without damage to any of the carrier parts. If the retaining spring 2 is broken or the assembly damaged in any other way the latter may be withdrawn from the shell and repaired or a new assembly quickly inserted in its place.

Other advantages resulting from the use of a channel member secured to the shell by means of which the assembly tube is held in place is that the channel may be secured to the shell at a sufficiently great number of points to give the channel substantially the same rigidity as the shell so that it is not damaged by the shocks to which the shell is subjected. With a sufficiently rigid channel, the assembly tube by virtue of its being retained by lips of substantial area as compared with tabs, as in the former types of carriers, will likewise withstand the effects of a considerably greater amount of shock than in former case without any signs of buckling. In addition when the assembly tube is seated against the head of the carrier there is no shearing force transmitted to the rivets or other means for retaining the assembly to the carrier body as would be the case if the assembly depended upon the tabs or ears for a substantial part of its longitudinal support. Experience has shown that in severe usage ears or tabs which are depended upon to support the assembly may even cut into the carrier body as a result of the force of shocks.

Another improvement which it is desired to point out is the arrangement for the outer convolution of the grid work 13 to rest upon the upper end of the sleeve 21 which is extended out to and flushed with the end of the assembly tube. This arrangement gives a substantial supporting area for the grid and also overcomes the possibility of the grid being bent out of shape to such an extent that it might fail entirely to be supported at the upper end of the assembly tube, as might be the case if the outer convolution passed on the inner side of the stem 18.

From the foregoing description it will be seen that a pneumatic dispatch carrier has been provided which is so constructed and assembled that any of the elements may be readily removed from the carrier body and repaired or replaced. It will also be seen that substantial strength and rigidity has been incorporated in the elements as embodied in the complete assembly. While the invention has been described with reference to a particular type of carrier it will be readily understood by those skilled in the art that it may be applied to other types of carriers, and further that the embodiment of the invention may be incorporated in other embodiments or modifications without departing from the spirit of the invention, and it is desired that only such limitations shall be placed thereon as are imposed by the prior art or set forth in the appended claims.

What I claim is:

1. In a pneumatic carrier having a loading inlet, an assembly carrying a closure member for the loading inlet, means for removably mounting said assembly in the body of said carrier, said means comprising track engageable surfaces embodied in the assembly, a track guideway longitudinally open for engaging said surfaces as the assembly is inserted and carried to mounted position, and means for securing said assembly in said position.

2. In a pneumatic carrier having a loading inlet, an assembly carrying a housing and a closure member for the loading inlet, means for removably inserting said assembly with its housing in the body of the carrier for mounting the same, said means comprising a guideway secured within the carrier body, means provided on the housing for slidably engaging said guideway as the assembly is inserted, and removable means for securing said assembly in mounted position.

3. In a pneumatic carrier having a loading inlet, an assembly carrying a housing and a closure member for the loading inlet, means for removably inserting said assembly with its housing in the body of the carrier for mounting the same, said means comprising a guideway secured within the carrier body, one or more projecting members provided on the housing for slidably engaging said guideway as the assembly is inserted, and removable means for securing said assembly in mounted position.

4. In a pneumatic carrier of the type having a longitudinally extending body and an open end, a closure member disposed to close the open end, said member embodying a longitudinally extending stem, a housing for enclosing said stem, means for normally retracting said stem into the housing, means for removably mounting said housing interiorly of said carrier body, said means embodying a longitudinally extending guideway secured to the inner surface of said carrier body, means on the housing for slidably engaging the guideway, and a removable member arranged to fix the housing with respect to the carrier body for retaining the same in mounted position.

5. In a pneumatic carrier of the type having a longitudinally extending body and an open end, a closure assembly embodying a housing and a member carried by the housing and disposed to close the open end, said member embodying a stem extending longitudinally of the housing, means for normally retracting said stem into the housing, means for removably mounting said assembly interiorly of said carrier body, said means embodying a longitudinally extending guideway secured to the inner surface of the carrier body, lips on the assembly housing for slidably engaging the guideway, and removable means arranged to pass through the housing and carrier body for retaining the assembly in mounted position with respect to the body of the carrier.

6. A carrier for pneumatic dispatch systems comprising a receptacle having an open end and a closure member normally disposed within said open end, a tube-like housing arranged to carry said closure member, said member being formed of a rod embodying a stem extending into said housing, a tubular collar through which said stem passes secured adjacent to the outer end of said housing with its outer end flush with said outer end of the housing and means tending to normally retract said stem into the housing, the outer portion of said rod having a part thereof extending from the housing formed into an arch extending across the interior of the open end of the carrier, and a remote part being formed into a flat coil joined to the arch and extending transversely of said open end, the outer convolution of said coil being disposed to extend across the outer end of said housing and sleeve and behind the stem where it extends from the housing, said convolution forming against said housing and sleeve an abutment by means of which said closure member is supported against shock longitudinally of the housing, and a shoulder formed by a relatively sharp bend in the arch portion at a point adjacent the plane of said coil for supporting the said portion of the closure member upon said outer convolution.

7. In a pneumatic carrier having a loading inlet, an assembly carrying a closure member for the loading inlet, and means for removably mounting said assembly in the body of said carrier, said means comprising a longitudinally extending member fixed to said body and providing means for receiving and alining said assembly when in mounted position and means for securing the assembly in said position.

8. In a pneumatic carrier having a loading inlet, and an assembly carrying a closure member for the loading inlet, a member fixed within the body of the carrier and arranged to provide receiving and alining surfaces for mounting the assembly therein, said surfaces being formed to provide for ready removal of said assembly, and means for securing the assembly in mounted position.

ELLERY IRVING.